United States Patent Office 2,724,298
Patented Nov. 22, 1955

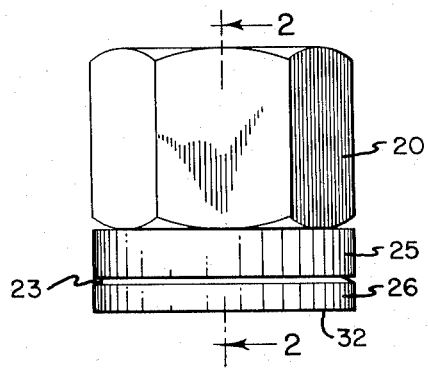
FIG.-1-
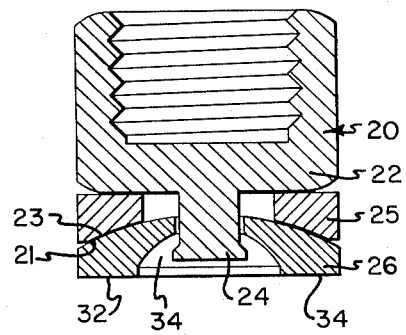
FIG.-2-
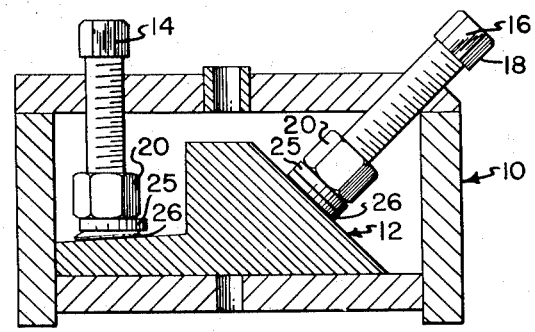
FIG.-3-
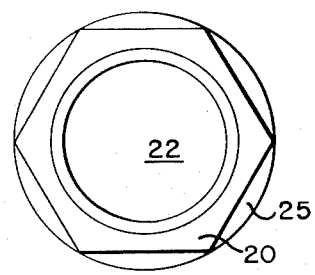
FIG.-4-
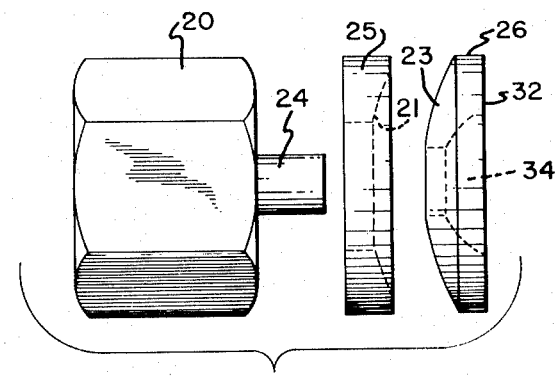
FIG.-5-
EMIL OLSON
*INVENTOR.*
HIS ATTORNEY

2,724,298

SELF-ADJUSTING SWIVEL SHOE

Emil Olson, Los Angeles, Calif.

Application March 14, 1955, Serial No. 494,179

6 Claims. (Cl. 81—40)

This invention relates to improvements in means for firmly holding an object such as a tool or a work piece, while it is working or being worked upon.

An object of the invention is to provide simple, compact and economical means for firmly holding an object without gouging or scratching its surface during the periods that operations are performed thereon, by bringing a shoe into contact with the article which, once contacted by the article, does not rotate with respect to the article.

Another and more specific embodiment of the invention is to provide a swivel shoe which is self-adjusting to compensate for irregularities.

The holder disclosed herein fills a growing need for an inexpensive, compact and reliable means for holding articles in jigs, fixtures and sundry tools used in aircraft and allied industries. The problem of retaining articles scratch free is intensified when the articles being handled are made of relatively soft material.

The ordinary practice of bearing upon an article with the end of a screw to hold the article secure enough for machining always results in a marred surface since the screw end leaves an impression in the article. Various unsuccessful means of overcoming this difficulty have been tried in the past and wide testing of the instant device has shown a good solution to the problem.

In essence, my invention contemplates providing a self-adjusting swivel shoe for use on a mechanical element, as a socket or a screw, the shoe having a smooth object contacting surface that bears against an object to be held and being mounted for rotation on a spindle engaging the screw or socket so that upon contact with the object, the shoe stops rotating with the socket or screw but continues to move axially of the screw in response to screw rotation, whereby the shoe is brought into frictional engagement with the article without scratching or gouging the article.

The shoe is mounted on a floating socket which permits it to cant to either side, so that it is automatically self-adjusting to compensate for irregularities in the work piece or elsewhere.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a side elevational view of my device;

Fig. 2 is a sectional view of the same taken on line 2—2 of Fig. 1;

Fig. 3 is a sectional view of a jig and work piece with two of my devices in use thereon;

Fig. 4 is an end view of my device;

Fig. 5 is an exploded side elevational view of my device.

A preferred embodiment which has been selected to illustrate my invention comprises a jig 10 which may be used for drilling holes in an article 12 which is contained therein. Although only one jig is illustrated, it is understood that others could be used and the principle of the invention is applicable to various tools. Two screws 14 and 16 containing any type of head, as the Allen head 18, are carried in threaded passages in the jig and are disposed so as to hold the work piece 12 securely during the drilling operations.

A mechanical element, preferably a cap 20 is attached to the inner end of screw 14 and there is a similar element provided on screw 16. The cap 20 is multi-sided for reception of a wrench so that there is a selectivity of rotating operations, that is, cap 20 may be threaded on screw 14, or screw 14 may be threaded in jig 10 without rotation of the socket. A wall 22 extends across one end of the cap 20 closing the same, and a shank 24, normal to wall 22, extends outwardly of member 20.

A floating socket 25 is mounted surrounding the shank 24 adjacent wall 22. A swivel shoe 26 is mounted surrounding the shank 24 adjacent the opposite side of the floating socket 25. The end of the shank 24 is provided with a peen 30, which holds the socket 25 and shoe 26 with respect to the cap 20.

The shoe 26 has a smooth flat article contacting surface 32 through which there opens an inwardly directed aperture 34 providing a chamber to accommodate the peen 30 in countersunk fashion inwardly from the article contacting surface 32.

The side of the floating socket 25 which is disposed adjacent the wall 22 of cap 20 is straight, while its opposite side is provided with an inwardly curved concave portion 21 adjacent the center thereof, which is adapted to receive a complementary curved convex portion 23 of the shoe 26. The concave portion 21 extends from a point inwardly from the edge of socket 25 to the open center thereof. The convex portion 23 of shoe 26 extends from the circumferential edge to the center thereof.

The distance from surface 22 to peen 30 is greater than the distance from the straight side of socket 25 to the bottom of the aperture 34, so that the socket 25 and swivel shoe 26 are loosely mounted with respect to the cap 20 and are free to move to a limited degree with respect to the cap 20 and shank 24.

In operation, the screw or other member to which mechanical element 20 is attached is threaded in jig 10 or the like until shoe 26 has surface 32 brought into contact with the article 12 or some other object to be clamped. Then there is the option of rotating the screw 14 further or rotating cap 20 for the final force required to hold article 12 firmly. In either case, when surface 32 contacts a surface of article 12, neither the article 12 nor shoe 26 rotates, thereby avoiding scratching of the surface of the article and gouging of the object being clamped.

This describes the operation of the device when used in connection with a smooth straight surface as shown in the right-hand portion of Fig. 1 of the drawings. It often happens, however, that the work piece has a slightly inclined surface. This can result from the fact that parts are not always completely consistent in fabrication. It may also result from drop forging of the parts to reduce manufacturing costs or from other causes. Angular compensation may also be required because of inaccuracy in tapping the hole in the jig, causing the cap 20 to extend at a slight incorrect angle with respect to the work piece 12.

In such cases, the article contacting surface 32 of the swivel shoe 26 still contacts the article and lies flat thereagainst, as shown in the left-hand portion of Fig. 1. However, its convex portion 23 swivels slightly within the socket formed by the concave portion 21 of the floating socket 25. The floating socket 25 is moved slightly out of line with the cap 20 and shoe 26. The looseness of the mounting of the socket 25 and shoe 26 permits such movements.

The result is that the article contacting surface 32 extends at a slight angle with respect to the longitudinal axis of the cap 20 to compensate for irregularities of the type set forth. While the amount of canting movement so provided may vary, it has been found that as much as eight and one-half degrees off center in each direction is practical to achieve with the construction shown, providing overall automatic self-adjustment of seventeen degrees.

It is preferable that the socket 25 and shoe 26 be no larger in diameter than the cap 20, so that they can pass through any opening capable of receiving the cap 20.

I claim:

1. In a work holding device, a threaded element comprising a threaded cap provided with a wall closing one end thereof, a projection extending from said wall at right angles thereto and exterior of said cap, a floating socket and a swivel shoe mounted on said projection, said socket and shoe each having an aperture through which said projection extends, said floating socket having a straight surface on one side thereof contacting the wall of said cap, said socket having a concave surface on the opposite side thereof, said shoe having a swivel surface on the side thereof adjacent said socket, said swivel surface movably engaging the concave surface of said socket to provide swivel mounting of said shoe with respect to said socket, said shoe having a work contacting surface on the opposite side thereof, said shoe being swivelly movable with respect to said cap to make said work contacting surface automatically self-adjusting to angle irregularities of the work with respect to the longitudinal axis of the cap.

2. The subject matter of claim 1, said shoe having a concave portion adjacent the center thereof, the end of said projection having an enlargement disposed within said concave portion in a countersunk manner.

3. The subject matter of claim 2, said shoe and socket being substantially equal in circumference to said cap to permit insertion thereof through an opening adapted to receive said cap.

4. The subject mater of claim 3, said socket and shoe being loosely mounted on said projection to afford an angular movement of said shoe of substantially eight degrees to each side of the longitudinal axis of said cap.

5. In a holding device for a work piece, a mechanical element, a shoe having a surface adapted to contact the work piece, means connecting said shoe to said mechanical element for rotary motion so that said element may be rotated with respect to said shoe for bringing said shoe into firm contact with the work piece, and a socket mounted between said shoe and mechanical element, said shoe engaging said socket and being angularly movable with respect thereto to provide angular adjustment of said shoe with respect to the work piece.

6. In a work holding device, a threaded cap having an end wall, a projection extending from said wall, a shoe mounted for rotation on said projection, and a socket mounted on said projection between said cap and shoe, said shoe being swivelly mounted with respect to said socket.

References Cited in the file of this patent

UNITED STATES PATENTS

| | | |
|---|---|---|
| 2,649,123 | Gulland | Aug. 18, 1953 |
| 2,665,598 | Hardy | Jan. 12, 1954 |